(12) United States Patent
Chen et al.

(10) Patent No.: US 9,020,794 B2
(45) Date of Patent: *Apr. 28, 2015

(54) ENABLING REAL-TIME TESTING OF ON-DEMAND INFRASTRUCTURE

(71) Applicant: International Business Machines Corporation, Armonk, NY (US)

(72) Inventors: Yen-Fu Chen, Austin, TX (US); John W. Dunsmoir, Round Rock, TX (US); Abhay Pradhan, Humayun Nagal (IN); Hari Shankar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,614

(22) Filed: Apr. 9, 2013

(65) Prior Publication Data
US 2014/0006624 A1 Jan. 2, 2014

Related U.S. Application Data

(63) Continuation of application No. 10/815,233, filed on Mar. 31, 2004, now Pat. No. 8,417,499.

(51) Int. Cl.
*G06F 17/50* (2006.01)
*G06G 7/62* (2006.01)
(Continued)

(52) U.S. Cl.
CPC *H04L 43/50* (2013.01); *G06F 9/50* (2013.01); *H04L 12/2697* (2013.01); *H04L 41/147* (2013.01); *H04L 41/5003* (2013.01); *H04L 41/5035* (2013.01); *H04L 41/22* (2013.01)

(58) Field of Classification Search
CPC ............ G06F 17/5009; G06F 11/3442; G06F 11/3457
USPC .............................. 703/13; 709/233; 718/104
See application file for complete search history.

(56) References Cited

U.S. PATENT DOCUMENTS 5,537,542 A 7/1996 Eilert et al.
5,726,913 A 3/1998 Grimsrud
(Continued)

FOREIGN PATENT DOCUMENTS

JP 2002063538 A 2/2002
JP 2002-109401 A 4/2002

OTHER PUBLICATIONS

Chandra et al, "An Online Optimization-based Technique for Dynamic Resource Allocation in GPS Servers", Technical Report UM-CS-2002-030, University of Massachusetts, Jul. 2002.*
(Continued)

*Primary Examiner* — Mary C Jacob
(74) *Attorney, Agent, or Firm* — John Pivnichny; Gregory K. Goshorn; Greg Goshorn, P.C.

(57) ABSTRACT

Provided are techniques for demonstrating the efficiency and effectiveness of a customer's information technology (IT) system and applications operating in a shared IT, or electronic business on-demand, environment. A test suite mimics hypothetical settings in an on-demand services environment (129) and then determines how the settings affect the allocation of resources in the on-demand services environment (129). The calculated allocation of resources is then compared to one or more service level agreements (SLAs) in order to determine compliance with a particular SLA.

15 Claims, 7 Drawing Sheets

(51) Int. Cl.
*H04L 12/26* (2006.01)
*G06F 9/50* (2006.01)
*H04L 12/24* (2006.01)

(56) References Cited

U.S. PATENT DOCUMENTS

| | | |
|---|---|---|
| 6,466,893 B1 | 10/2002 | Latwesen et al. |
| 6,466,898 B1 | 10/2002 | Chan |
| 6,467,052 B1 | 10/2002 | Kaler et al. |
| 6,507,809 B1 | 1/2003 | Yoshino et al. |
| 6,701,342 B1 | 3/2004 | Bartz et al. |
| 6,763,389 B2 | 7/2004 | Kryskow, Jr. |
| 6,816,905 B1 * | 11/2004 | Sheets et al. .......... 709/226 |
| 6,925,493 B1 | 8/2005 | Barkan et al. |
| 7,080,378 B1 | 7/2006 | Noland et al. |
| 7,120,694 B2 | 10/2006 | Sinha |
| 7,184,398 B2 | 2/2007 | McKinnon, III et al. |
| 7,184,945 B1 | 2/2007 | Takahashi et al. |
| 2002/0099669 A1 | 7/2002 | Lauer |
| 2002/0129143 A1 | 9/2002 | McKinnon, III et al. |
| 2002/0198995 A1 | 12/2002 | Liu et al. |
| 2003/0158884 A1 | 8/2003 | Alford, Jr. |
| 2003/0167461 A1 | 9/2003 | Stecher |

OTHER PUBLICATIONS

D'Arienzo et al, "Automatic SLA Management in SLA-Aware Architecture", 10th International Conference on Telecommunications, Feb. 23-Mar. 1, 2003, vol. 2, pp. 1402-1406.*

Nargarajan et al, "Modelling and Simulation of an Alarm Based Network Management System for Effective SLA Monitoring and Management", SCI 2003. 7th World Multiconference on Systemics, Cybernetics and Informatics Proceedings, Jul. 27-30, 2003.* http://citeseerx.ist.psu.edu/viewdoc/summary?doi=10.1.1.90.298, Accessed Apr. 27, 2012, © 2007-2010.

Levy et al, "Performance Management for Cluster Based Web Services," IFIP/IEEE Eight International Symposium on Integrated Network Management, Mar. 24-28, 2003, pp. 247-261.

Pazel et al., "Neptune: A Dynamic Resource Allocation and Planning System for a Cluster Computing Utility," 2nd IEEE/ACM International Symposium on Cluster Computing and the Grid, p. 57, 2002.

He et al., "Resource Provisioning in a Multi-Service Enabled ADSL System," 10the International Conference on Telecommunications, vol. 2, pp. 1105-1112, Feb. 23-Mar. 1, 2003.

Chandra et al., "Dynamic Resource Allocation for Shared Data Centers Using Online Measurements," IWQoS 2003, LNCS 2707, pp. 381-398, 2003.

Byde et al., "Market-Based Resource Allocation for Utility Data Centers," Hewlett-Packard Company, HPL-2003-188, Sep. 9, 2003.

WOSA for PCT/EP2005/051445.

Ranjan et al., Qo-S-Driven Server Migration for Internet Data Centers, IWQoS 2002 Submission #60, 2002.

Appleby et al., OCeano—SLA Based Management of a Computing Facility, 2001, IEEE, 2001.

* cited by examiner

ENABLING REAL-TIME TESTING OF ON-DEMAND INFRASTRUCTURE

CROSS-REFERENCES TO RELATED APPLICATIONS

The present application is a continuation and claims the benefit of the filing date of an application entitled, "Enabling, Real-Time Testing of On-Demand Infrastructure to Predict Service Level Agreement Compliance" Ser. No. 10/815,233, filed Mar. 31, 2004, now U.S. Pat. No. 8,417,499, assigned to the assignee of the present application, and herein incorporated by reference.

TECHNICAL FIELD

The present invention relates generally to electronic business on demand (EBOD) and, more specifically, to techniques for providing a real-time infrastructure scenario testing within an EBOD environment.

BACKGROUND OF THE INVENTION

For decades, International Business Machines Corp. (IBM) of Armonk, N.Y. has been at the forefront of new paradigms in business computing. Currently IBM is developing a new computing utility service initiative, or "e-business on demand" (EBOD). Briefly, EBOD is a form of information technology (IT) based upon "power by the hour" in which a client pays only for the level of computing services actually used. Customers of IBOD transfer their IT environment to a utility management infrastructure (UMI) and pay only for the actual computing services received. Like electricity, water and gas, IT is treated as another utility. Thus, by eliminating the responsibility of building and maintaining IT operations, providing necessary education and training to administrators, and having to comply with applicable regulations, the customer can focus on their core business while enjoying variable pricing, automated processes and the invaluable resilience and responsiveness of a shared infrastructure provided by IBM.

Customers transitioning from a dedicated IT environment to an EBOD environment may be concerned about the efficiency of the new paradigm and their loss of control of actual IT operations. Although current vendors of shared IT infrastructure may allow customers to analyze the responsiveness or their IT system, there are no real-time service testing tools that support the new emerging utility-like middleware such as The IBM EBOD infrastructure.

Existing products include typical system testing suites, WinRunner published by Mercury Interactive, Inc. of Sunnyvale, Calif. and the forthcoming Blue Typhoon graphical user interface (GUI) by IBM. Typical system testing suites simply employ computer commands such as "top" "sar," "wait," "vmastat," "netstat" and "ping" to determine utilization of resources such as CPU, memory, disks and network but do not provide a way to test hypothetical loads.

WinRunner captures actual IT events and then, based upon the captured events, emulates users performing the work of maneuvering through a series of GUIs, either client or web-based. The number of users can be adjusted but WinRunner only test hits on application specific functionalities requiring some type of user interface. In other words, WinRunner tests user interfaces rather than simulating the stress on a particular application and the use of specific shared capabilities like processing, network functionality and data storage.

Blue Typhoon GUI is a Java swing/applet application that enables customers to modify computing capacity and allocate and/or de-allocate computing resources. Although this approach provides customers with a passive view of resources, Blue Typhoon does not provide a way to retrieve share system/application data in an active manner with real-life, real-time testing.

SUMMARY OF THE INVENTION

Provided is an apparatus and method for modelling the efficiency and effectiveness of a customer's information technology (IT) system and applications operating in a shared IT environment. The claimed subject matter enables a Universal Management Infrastructure (UMI) provider to demonstrate whether or not an actual customer's request will match or exceed limits of the customer's service level agreement (SLA). Desired IT settings are able to be simulated in the UMI environment by means of a test suite. The test suite enables the customers to generate a production-level load and stress on to virtual computer, thus gaining insight into their particular e-business on-demand (EBOD) environment. This capability enables the customer to identify possible system flaws in advance so that necessary adjustments can be made to maximize the efficiency of their subscribed services. In other words, the claimed subject matter enables the customer to configure and perform real-time testing of their EBOD environment.

The IBM UMI environment consists of resources such as processing, network and data storage that can handle a large number of users and transactions in the system. A particular client typically only needs a small fraction of this capacity and contracts for a desired level of service. Using helpdesk software such as Tivoli Service Desk (TSD) provided by IBM as an example, the claimed subject matter is able to simulate accesses to detect system response, detect whether or not endpoint machines are optimizing resources such as network/storage capacity and transmit a load representative of that which an typical end user (help desk agent) would perform on a daily basis. In this manner, a customer can analyze and understand the behavior of the virtual computer and, more importantly, the behavior of their company's critical applications within the UMI.

The present invention enables the customer to compare a hypothetical load against a SLA so that adjustments can be made, if necessary, to manage or optimize the SLA. In addition, prior to the formation of a SLA, a potential customer can be assured that a proposed SLA is optimized and meets their needs.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE FIGURES

A better understanding of the present invention can be obtained when the following detailed description of the disclosed embodiments is considered in conjunction with the following drawings.

DETAILED DESCRIPTION OF THE FIGURES

Although described with particular reference to a UMI environment, the claimed subject matter can be implemented in any information technology (IT) system in which load and/or stress testing is desirable. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

Figure 1:
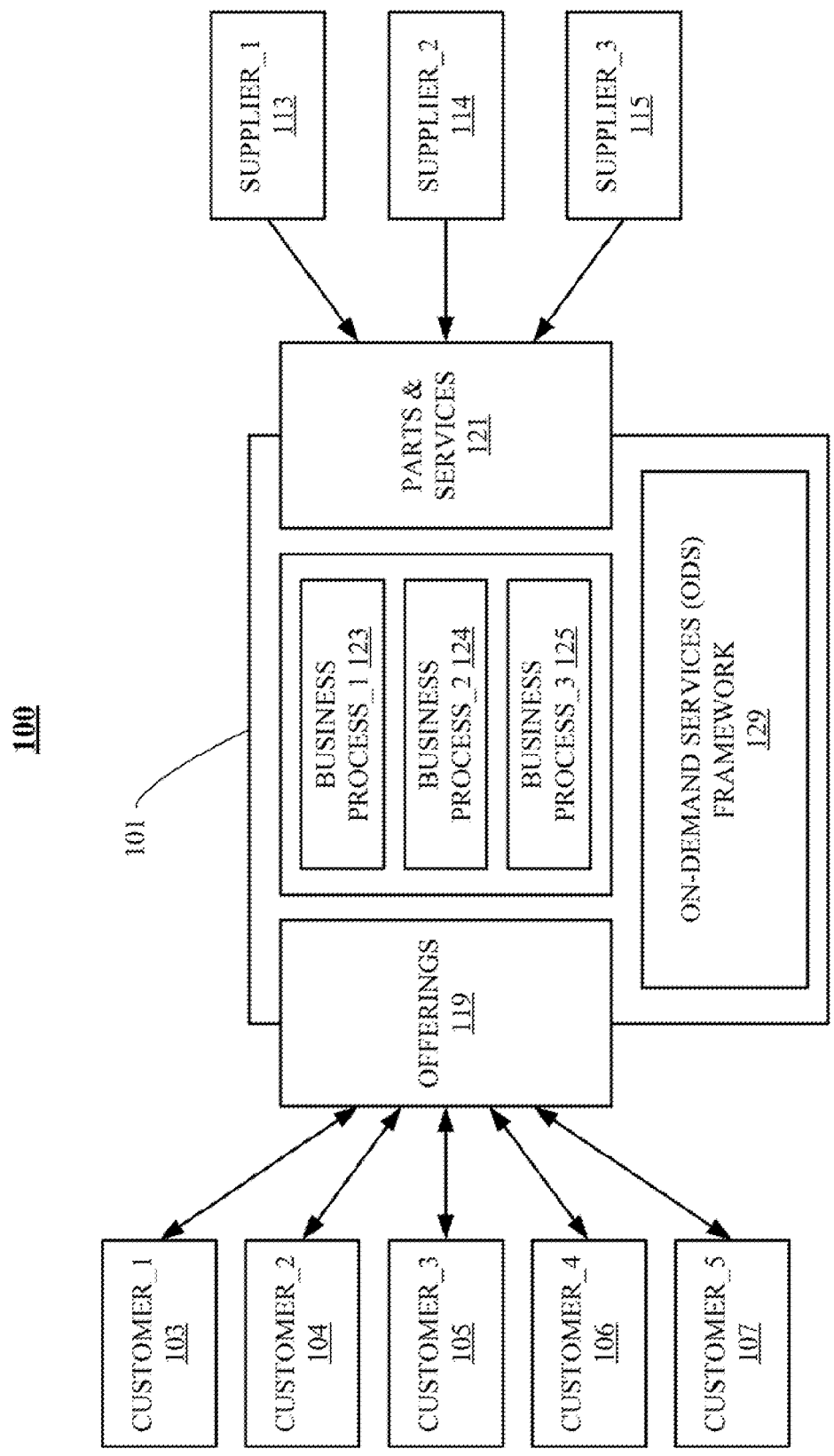
FIG. 1 is a black diagram of an exemplary Universal Management Infrastructure (UMI) architecture incorporating the claimed subject matter.

Turning now to the figures, FIG. 1 is a block diagram of an exemplary Universal Management Infrastructure (UMI) architecture 100 incorporating the claimed subject matter. An enterprise 101 services a number of customers, such as a customer_1 103, a customer_2 104, a customer_3 105, a customer_4 106 and a customer_5 107. Enterprise 101 also has relations with a number of suppliers, a supplier_1 113, a supplier_2 114 and a supplier_3 115. For the sake of this example, the particular type of business engaged in by enterprise 101 is not specified because UMI architecture 100, as well as the claimed subject, matter can be applied to practically any type of business that employs an information technology (IT) infrastructure. In fact, UMI architecture 101 can even apply to a hypothetical business that does not have customers and/or suppliers.

In this example, suppliers 113-115 provide parts and services 121 to enterprise 101 and customers 103-107 purchase products, or offerings, 119. Enterprise 101 includes a business process_1 123, a business process_2 124 and a business process_3 125 to enable enterprise 101 to convert parts and services 121 into offerings 119. Examples of types of business processes include, but are not limited to, a manufacturing supply system, an accounting system, a billing system, a customer management system and a payroll system. The specific number of customers 103-107, suppliers 113-115 and business processes 123-125 are used for the sake of an example only; the claimed subject matter applies equally well to small, medium and large enterprises with any particular number of such relationships.

Enterprise 101 incorporates a virtualized infrastructure, or an "On-Demand services (ODS) Framework," 129, which, in this example, is an e-business on demand (EBOD) environment designed by international Business Machines Corp. (IBM), of Armonk, N.Y. The IBM EBOD environment is designed for business customers and can deliver accounting, human resource, and customer relationship management applications over the Internet for a usage-based charge, or can be used to provide computing resources, e.g. processors, storage, memory, to a company as needed to support their operation.

Figure 2:
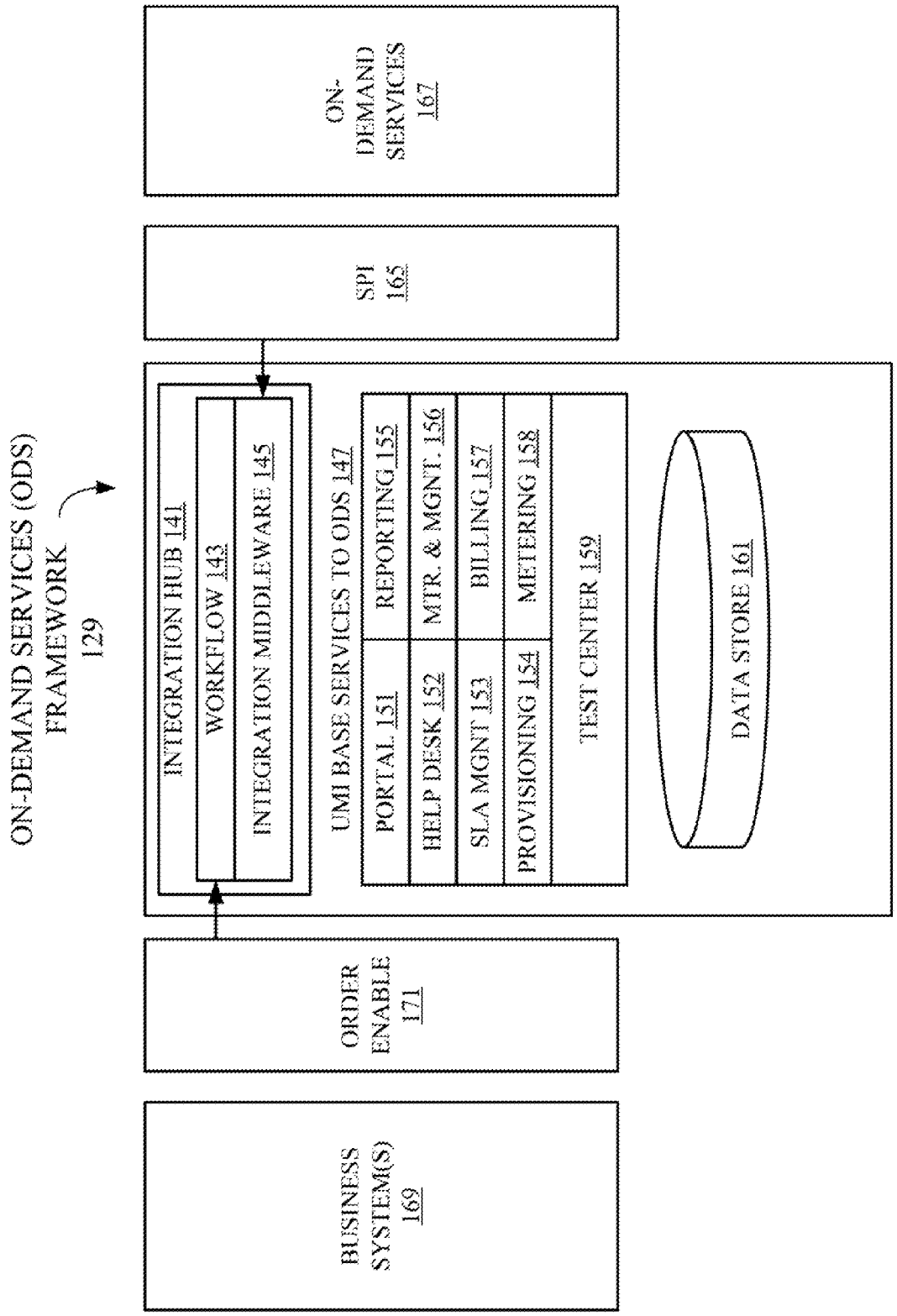
FIG. 2 is a block diagram an On-Demand Service (ODS) Framework the implements the claimed subject matter.

FIG. 2 is a block diagram of ODS Framework 129 of FIG. 1 in more detail. Included in FIG. 2 is an ODS block 167 representing the various on-demand services that may be available in an ODS environment such as the IBM EBOD environment. As mentioned above, examples of ODS services include, but are not limited to, a manufacturing supply system, an accounting system, a billing system, a customer management system and as payroll system. In this example ODS services 167 are coupled to ODS framework 129 via a service programming interface (SPI) 165. In this example, SPI 165 is a set of application programming interfaces (APIs). Those with skill in the computing arts should recognize that there are other ways to implement the connection between ODS block 167 and ODS framework 129 other than via SPI 165, such as but not limited to secure sockets.

Also included in FIG. 2 is a business systems block 169, which represent any or all particular business process 123-125 (FIG. 1) that may be required to provide access to one or more of the various ODS services offered by enterprise 101 (FIG. 1). Business systems 169 is coupled to ODS framework 129 via an order enable block 171, which can represent software, hardware or human operators for communicating information from business systems to ODS framework 129.

ODS framework 129 includes an integration hub 141 for coordinating the interactions among business system 169, ODS services 167 and ODS framework 129. Integration hub 141 includes a workflow component 143 and an integration middleware component 145. Workflow component 143 manages communication and requests from business systems 169 and integration middleware component 145 communication and requests from ODS block 167. While workflow component 143 communicates primarily with integration middleware component 145, integration middle ware component 145 is responsible for handling communication and requests from both workflow component 143 and ODS services block 167 to and from a UMI base services 147 to ODS component 167.

UMI base services 147 include a portal 151, which is a communications interface between UMI base services 147, the rest of ODS framework 129 and any entity, such as software from another vendor, that is external to ODS framework 129 and requires a direct communication link to UMI base services 147. Those with skill in the computing arts will realize there are a number of methods of implementing portal 151, including but not limited to, APIs and secure sockets. Additional components of UMI base services 147 include a help desk component 152, a service level agreement (SLA) component 153, a provisioning component 154, a reporting component 155, a Monitoring and Management component 156, a billing component 157, a metering component 158 and a test center component 159.

Help desk component 152 may be either an automated system such as a typical telephone response system or a fully or partially human staffed system in which help desk component 152 serves to automate communication and data retrieval tasks for employees that work at a corresponding help desk department of enterprise 101 (FIG. 1).

Service level agreement (SLA) management component 153 monitors and controls the interactions between OSD framework 129 and the client enterprise. Interactions include access to system resources by customers 103-107 (FIG. 1) and/or suppliers 113-115 (FIG. 1). A SLA is typically a contractual agreement between the provider of ODS framework 129 and the enterprise concerning the amount of resources of ODS framework 129 to which the enterprise is entitled and the cost of those resources. In other words, SLA management component 153 determines whether or not enterprise usage and UMI services are meeting, exceeding or otherwise complying with their specific SLA and then takes appropriate actions based upon that information. Data concerning SLAs is stored in a data store 161.

Provisioning engine 154 provides for the automation of tasks and the distribution of resources related to the resources within ODS framework 129. Specifically, provisioning engine 154 enables the allocation of resources such as servers, data storage, network resources and firewalls to meet enterprise demand as required by an SLA. In addition, provisioning engine 154 facilitates the distribution of software within the ODS framework 129.

Reporting component 155 is responsible for the production of reports on any or all of enterprise 101, business processes 123, 125 and 127 and ODS framework 129. Reports may include, but are not limited to, production reports, billing reports, inventory reports, customer reports, performance reports and SLA compliance reports. Pre-defined report templates and generated reports are stored in data store 161.

Monitoring and Management (M&M) component 156 is responsible for the collection of information on and provides the interface for the management of OSD framework 129 and the other UMI base services 147. Collected information is stored in data store 161 and is made available, either directly or through data store 161, to help desk 152, reporting component 155 and a billing component 157, explained below.

Billing component 157 produces invoicing and billing information for the enterprise for its use of ODS framework 129, based primarily on information from SLA management component 153, and a metering component 158, described below.

Metering component 158 keeps track of enterprise use of ODS framework 129, as well as any necessary internal information relative to the operation of ODS framework 129. Information collected by metering component 158 is stored in data store 161 and available for use by help desk component 152, reporting component 155, M&M component 156 and billing component 157.

Finally, test center component 159 controls such activities as customer profiling, test data generation, and test storage and scheduling for ODS framework 129. Test center component 159 is explained in more detail below in conjunction with FIG. 5.

Figure 3:
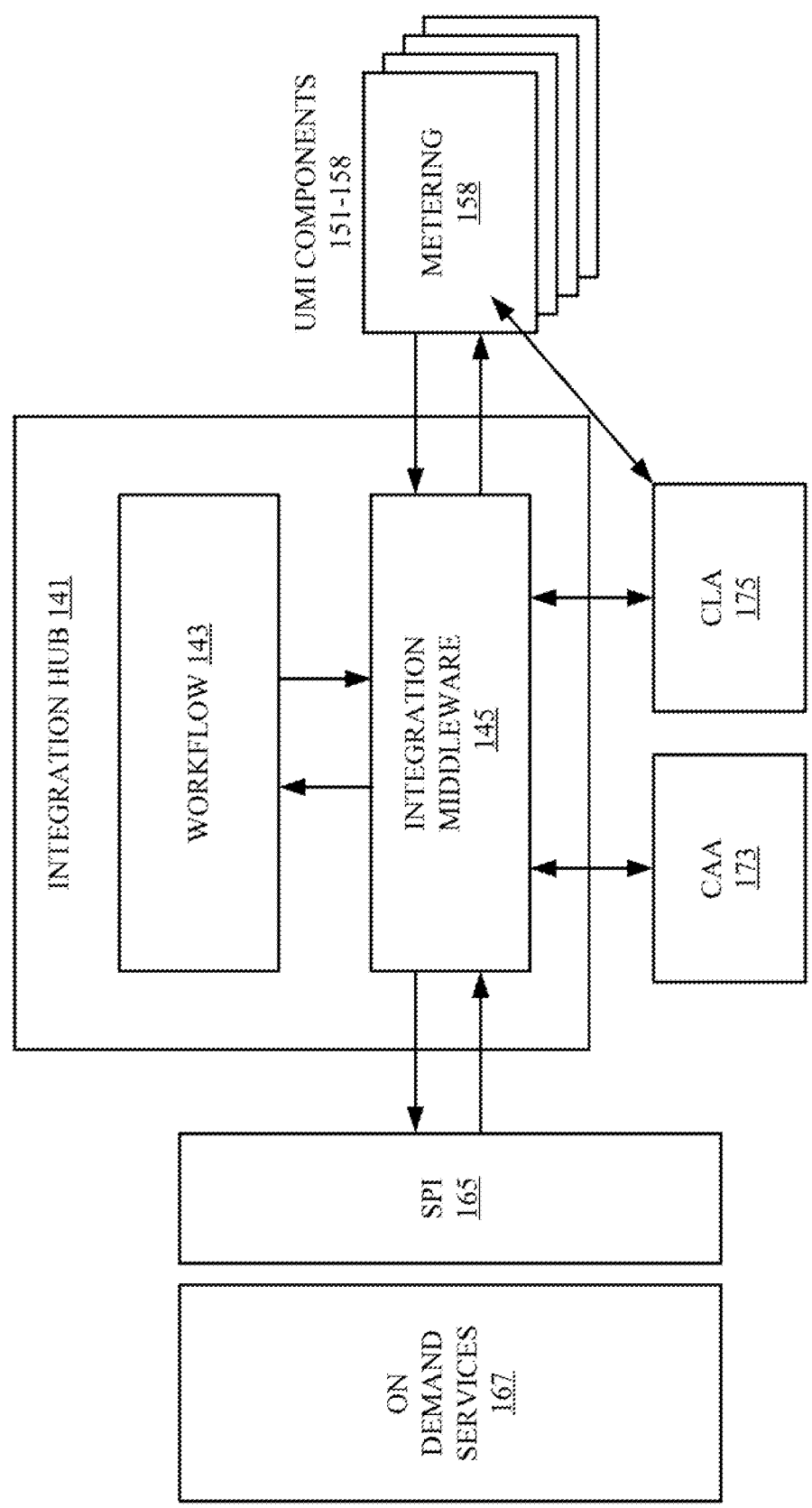
FIG. 3 is a block diagram of an integration hub, introduced in FIG. 2, in more detail.

FIG. 3 is a block diagram of integration hub 141 of FIG. 2 in more detail, with particular attention paid to communication between particular components of ODS framework 129 during processing of SPI 169 requests. As explained above in conjunction with FIG. 2, communication both to and from ODS block 167 is transmitted via SPI 165. A specific request from ODS 167 via SPI 165 is transmitted to integration middleware 145, which then determines the appropriate component to handle the request. Possibilities include a central authentication and authorization (CAA) component 173, which ensures that the specific request is from an authorized source, and a common login and audit (CLA) component 175, which, once a particular source has been authenticated by CAA 173, provides a login and records transactions.

Requests that arrive to integration hub 141 following authentication by CAA 173 and login by CLA 175 are then routed to appropriate UMI components 151-158. For example, metering component 158 both records a particular user's access by way of CLA 175 and records the particular users' usage of ODS framework 129. As explained above, workflow component 143 regulates integration middleware 145 with respect to the management of transactions within ODS framework 129. Workflow component 143 enables automation of operational processes among UMI components 151-158. Workflow component 143 also coordinates processes that are partly manual steps and partly automated steps. For manual steps, workflow component 143 performs tasks such as, but not limited to, tracking progress, enforcing time limits and sending alerts based on preset business rules.

Figure 4:
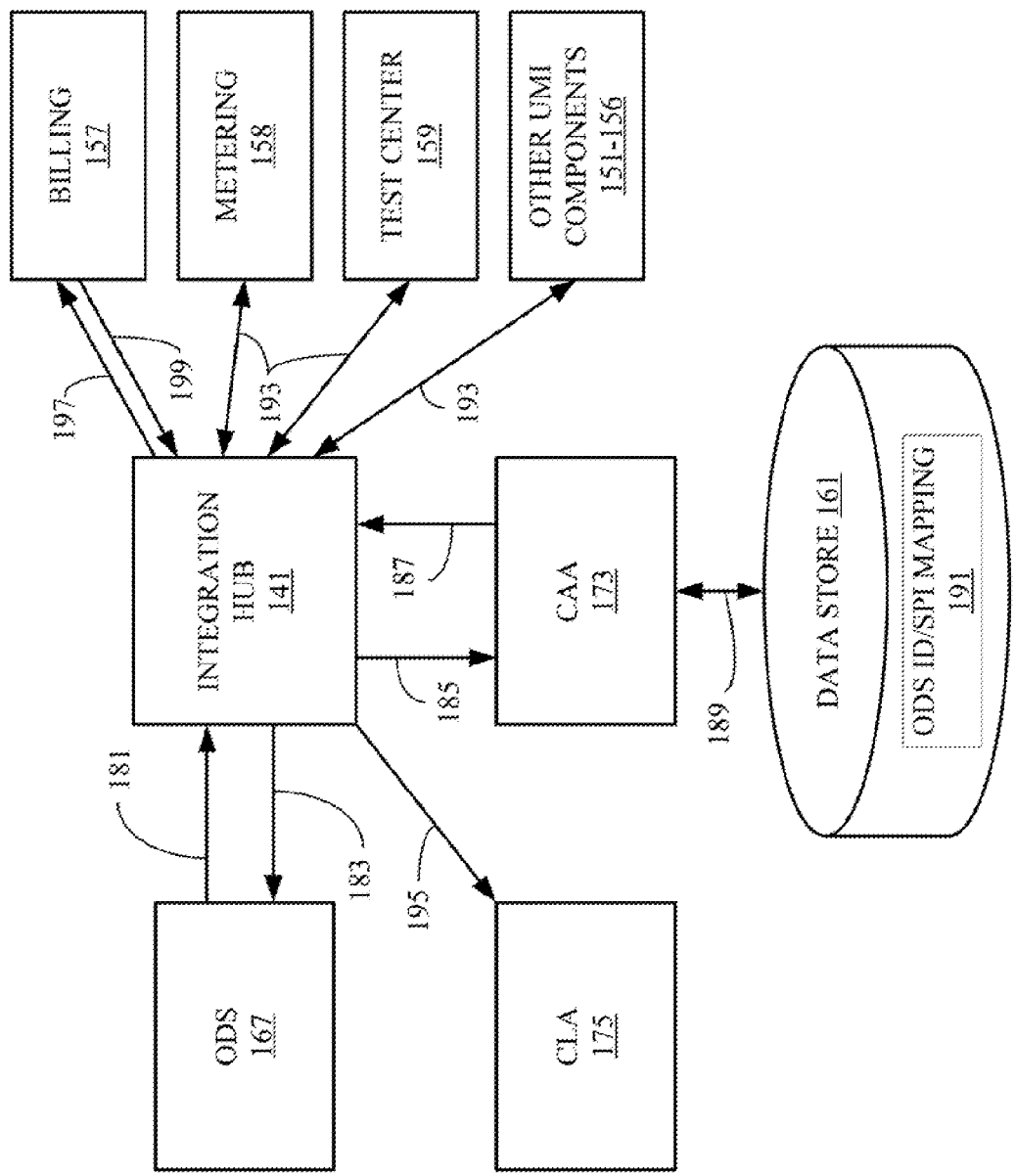
FIG. 4 is a block diagram illustrating the interaction among the integration hub and other various other components of the ODS framework of FIG. 2.

FIG. 4 is a block diagram that illustrates the interaction among integration hub 141, UMI components 151-158, ODS 167, CAA 173 and CLA 175 in more detail, all of which were explained above in conjunction with FIGS. 2 and 3. ODS 167 communicates with integration hub 141 by sending requests 181 and receiving responses 183. For the sale of simplicity, SPI 165 (FIG. 3) is not shown in FIG. 4.

An initial ODS request 181 from a particular user, such as a customer 103-107 or a supplier 113-115 (FIG. 1), typically needs to be authenticated by ODS framework 129 (FIG. 2). This is accomplished by integration hub 141, which extracts an ODS identification (ID) from a digital certificate in the initial request 181 and transmits ODS ID 185 to CAA 189. Typically, the ODS ID, which can be, but is not limited to, a password, is established when ODS 167 is setup for a particular client. CAA 173 then employs the digital certificate for authentication and authorization. Basically, CAA 173 performs authentication and authorization based upon an ODS ID/SPI mapping 191 retrieved in response to a request 189 to data store 161.

If the particular user is authenticated, then CAA 173 transmits an ODS authorization 187 back to integration hub 141. Once integration hub 141 has received this authorization, integration hub 141 is able to send and receive requests and responses 193 from UMI components 151-158 on behalf of the authenticated user. For the sake of simplicity, only billing component 157 illustrates requests and responses 193 broken out into separate paths representing requests 197 and responses 199. Finally, the authentication and authorization activity is logged 195 to CLA 175.

Figure 5:
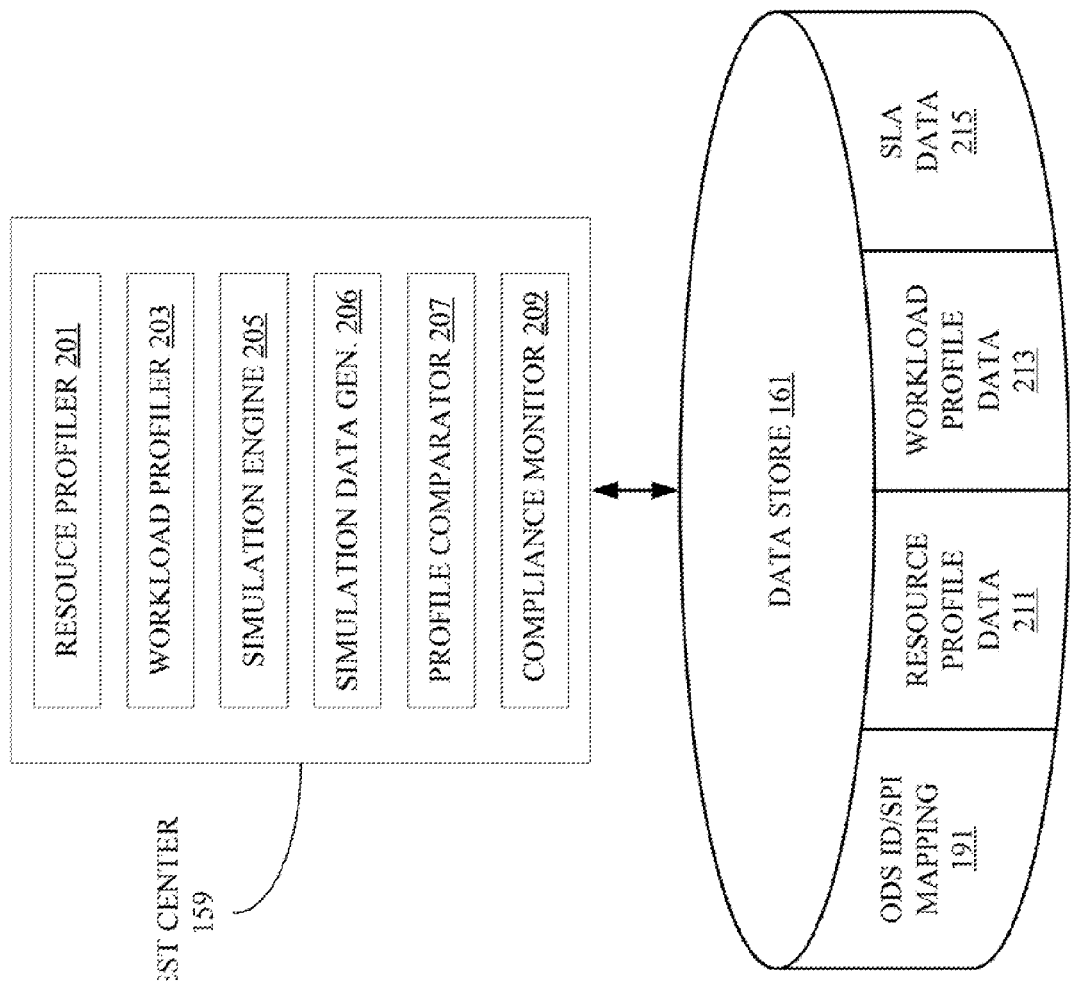
FIG. 5 is a block diagram of as test center component of the ODS framework of FIG. 2.

FIG. 5 is a block diagram of test center 159 of FIGS. 2-4 in more detail. Also included in FIG. 5, is data store 161, illustrating exemplary data areas relevant to the claimed subject matter. Test center 159 includes a resource profiler component 201, a workload profiler component 203, a simulation engine 205, a simulation data generator 206, a profile comparator 207 and a compliance monitor 209.

Resource profiler component 201 compiles resource profile data 211, which is stored in data store 161. Resource profile data 211 represents a particular client's resources allotments in the ODS framework 129 as well as any other available resources. Examples of allocated resources might include, but are not limited to, processing cycles, number of required servers, network bandwidth and data storage requirements. Each of the allocated resources have parameters associated with them, such as a base resource allotment, a maximum resource allotment, a resource cost and rules for dynamically reallocating the resources based upon the client's workload demand. An example of an available resource is the types of available processors. For example, a user might have contracted to use an Intel architecture but have a need to know how their applications function in a more robust server environment.

Workload profiler component 203 generates workload profile data 213, also stored in data store 161. Workload profile data 213 represents a particular client's typical workload with respect to the client's allocated resources as described in the customer's resource profile data 211, or workload with respect to allocations that use resources. For example, business process_1 123 of enterprise 101 (FIG. 1) may typically generate one hundred (100) calls per day to billing component 157 of ODS framework 129 (FIG. 2), with each request 197 averaging one kilobyte and each response 199 averaging two kilobytes. In addition, one transactions may require an average of one hundred (100) processing cycles to generate a response 199 from an average request 197 and generate a one megabyte chunk of data storage 161 (FIGS. 2 and 4). This information is stored in workload profile data 213 as a typical workload for business process_1 123. Each business process 123-125 has data in workload profile data 213 corresponding to its typical transactions and each transaction's utilization of such parameters as processing cycles, bandwidth and data storage.

In addition to workload profile data 213 based upon a particular customer's actual usage, workflow profile data 213 includes data corresponding to a hypothetical client, perhaps based upon a collective or predicted average. In this manner, a potential customer can generate and examine scenarios corresponding to a potential workload, thus either assuring themselves that ODS framework 129 can handle the business or predicting a particular level of SLA that might be appropriate for the potential client. Workload profile data 213 can also be stored in configuration files so that various hypothetical scenarios are saved for future reference and can be modified if necessary.

Simulation engine 205 employs workload profile data 213 to generate hypothetical workloads based upon projected changes in a client's workload entered by the client or administrator via the manipulation of parameters in a GUI (not shown). For example, based upon a figure for an average number of transactions to billing component 157, simulation engine 205 can estimate resources of ODS framework 129 that would be required to increase an average workflow of one hundred transactions per day to two hundred transactions per day. Simulations can be generated with varying degrees of granularity. For example, a client may know that business process_1 123 is going to experience a surge in demand on a certain date. In this case, workflow profile data 213 includes information indicating that business process_1 123 typically executes one hundred (100) transactions against billing component 157, fifty (50) transactions on reporting component 155, two hundred transactions on metering component 158, and so on. Simulation engine 205 then generates hypothetical workloads corresponding to each particular, applicable component 151-158. Various combinations of parameters can be saved by a client so that a particular simulation represented by a specific set of parameters can be rerun or tweaked simply by modifying the stored set of parameters. This feature prevents the unnecessary reentry of parameters.

In addition to a creating an estimation of ODS framework 129 response to a particular hypothetical demand, simulation engine 205 can actually use simulated data to make a physical test on ODS framework 129. For example, using the example above of one transactions that requires one hundred (100) processing cycles and one megabyte chunk of data storage 161, simulation data generator 206 generates appropriately sized dummy programs, network data packets and blocks of simulated data so that simulation engine 205 is a able to actually consume processing cycles, transmit network traffic and allocates blocks of data storage 161 in amounts that equal the hypothetical load. In this manner, the hypothetical workload is simulated using the actual available resources and infrastructure. An exemplary data acquisition process 240 is described below in conjunction with FIG. 7.

Simulation engine 205 can create hypothetical schedules for predicted or hypothetical workloads so that the effect of timing issues can be factored into the simulation. For example, the client may know that web traffic and corresponding product orders from customers typically peak between 5:00 pm and 6:00 pm and that report processing can be delayed until after the 5:00 rush. In this case, different types of processing can be segregated from each other and the effect of various segregation schemes can be evaluated.

In an alternative embodiment, simulation engine 205 can make predictions on hypothetical scenarios of a first client based upon a match between the hypothetical scenario and actual resource profile data 211 and workload profile data 213 corresponding to a second client whose actual data closely matches the hypothetical scenario.

Profile comparator 207 compares the hypothetical workloads produced by simulation engine 205 then to resource profile data 211. In this manner, test center 159 determines whether or not enough resources exist and whether or not the existing resources are available to service the hypothetical workload. It should be noted that this determination is accomplished without impact on the actual resources of ODS framework 129 other than perhaps hits on data store 161 and the processing cycles required to perform the simulation itself.

Compliance monitor 209 takes the results of both simulation engine 205 and profile comparator 209 and determines whether or not projected or hypothetical workloads either will attempt to utilize unavailable resources or violate the terms of a client's SLA, which is stored in a SLA data portion 215 of data store 161. The ability to create multiple hypothetical workloads and evaluates them with simulation engine 295 enables the client to determine an appropriate SLA for projected business and whether a current SLA is cost efficient.

Once processing of simulation engine 205, profile comparator 207 and compliance monitor 209 is complete, then ODS framework 129 signals the client with the results.

Figure 6:
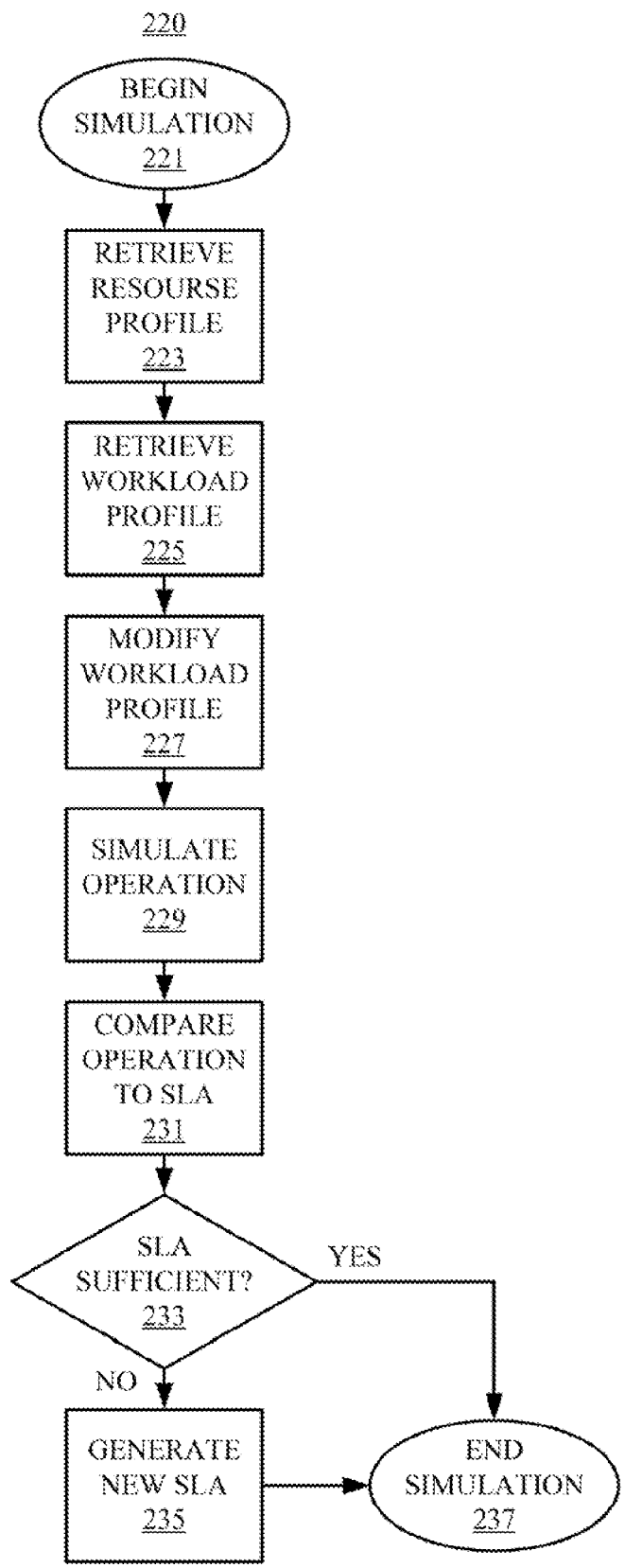
FIG. 6 is a flow chart of a simulation process that generates a prediction of an impact a specified workflow has on system resources and then compares the prediction to a client's service level agreement.

FIG. 6 is a flow chart of a Simulation and Compare process 220 that generates a prediction of the impact a specified workflow has on system resources and then compares the prediction to a client's service level agreement. Process 220 starts in a "Begin Simulation" step 221 and processing proceeds immediately to a "Retrieve Resource Profile" step 223, in which process retrieves resource profile data 211 (FIG. 5) for a particular client from data store 161 (FIGS. 2, 4 and 5). As explained above in conjunction with FIG. 5, resource profile data 211 represents a particular client's resources allotments and associated parameters in the ODS framework 129 (FIG. 2).

Control then proceeds to a "Retrieve Workload Profile" step 225 in which process 220 retrieves workload profile data 213 corresponding to the client's whose resource profile data 211 was retrieved in step 221. As explained above in conjunction with FIG. 5, workload profile data 213 represents the particular client's typical workload with respect to the client's allocated resources as described in the customer's resource profile data 211. In addition, various parameters may have corresponding importance and/or prioritization attributes that affect a particular simulation.

Once a particular client's resource profile data 211 and workload profile data 213 have been retrieved, control proceeds to a "Modify Workload Profile" step 227 in which the client can modify parameters in the retrieved workflow profile data 213 in order to express hypothetical scenarios, or projected workflow, such as sudden spikes in demand for website access. In other words, by modifying workflow profile data 213, the client can test anticipated changes in the client's actual workflow. Changes to workflow profile data 213 are accomplished via a GUI (not shown), the creation and operation of which should be understood by those with skill in the programming arts. Further, alternative scenarios, and their corresponding workload profile data 213, can be stored in configuration files, loaded into process 220 during step 225 and modified, if necessary, in step 227.

Once the client has modified the desired parameters in step 227, the control proceeds to a "Simulate Operation" step 229 in which process 220 simulates the projected workflow as performed on the resources defined in the client's resource profile data 211. Simulation operation step 229 is explained in more detail below in conjunction with FIG. 7. Next, control proceeds to a "Compare Operation to SLA" step 231 in which, first, SLA data 215 (FIG. 5) is retrieved from data store 161 and, then, the results of the simulation operation performed in step 229 is compared to the clients SLA data 215.

Control then proceeds to a "SLA Sufficient?" step 233 in which process 220 determines whether or not the projected workflow as calculated in step 229 exceeds the client's limits with respect to resources, as defined in the client's SLA. If the projected workflow does not exceed to client's SLA, then the client is notified of that first and control proceeds to an "End Simulation" step 237 in which processing is complete. If in step 335 the projected workflow exceeds the client's limits as defined by the SLA, then control proceeds to a "Generate New SLA" step 235 in which SLA data 215 is modified so that SLA data 215 conforms with the results of the simulation. In addition, process 220 may interact with billing component 157 (FIGS. 2 and 4) in order to calculate a cost associated with the needed level of service predicted by the simulation.

The modified SLA data 215 is then presented to the client so that the client can determine whether or not to modify their SLA so that ODS framework 129 can handle the expected workload within the agreement. Multiple possible conforming SLAs, along with their respective cost, may be proposed to the client based upon a particular simulation. For example, the simulation may raise the possibility that a client's business may be better served by switching from an Intel architecture agreement to a server based agreement. In the alternative, process 220, instead of predicting a needed level SLA, predicts a maximum work load a particular SLA can tolerate before the client is in violation of the agreement.

Figure 7:
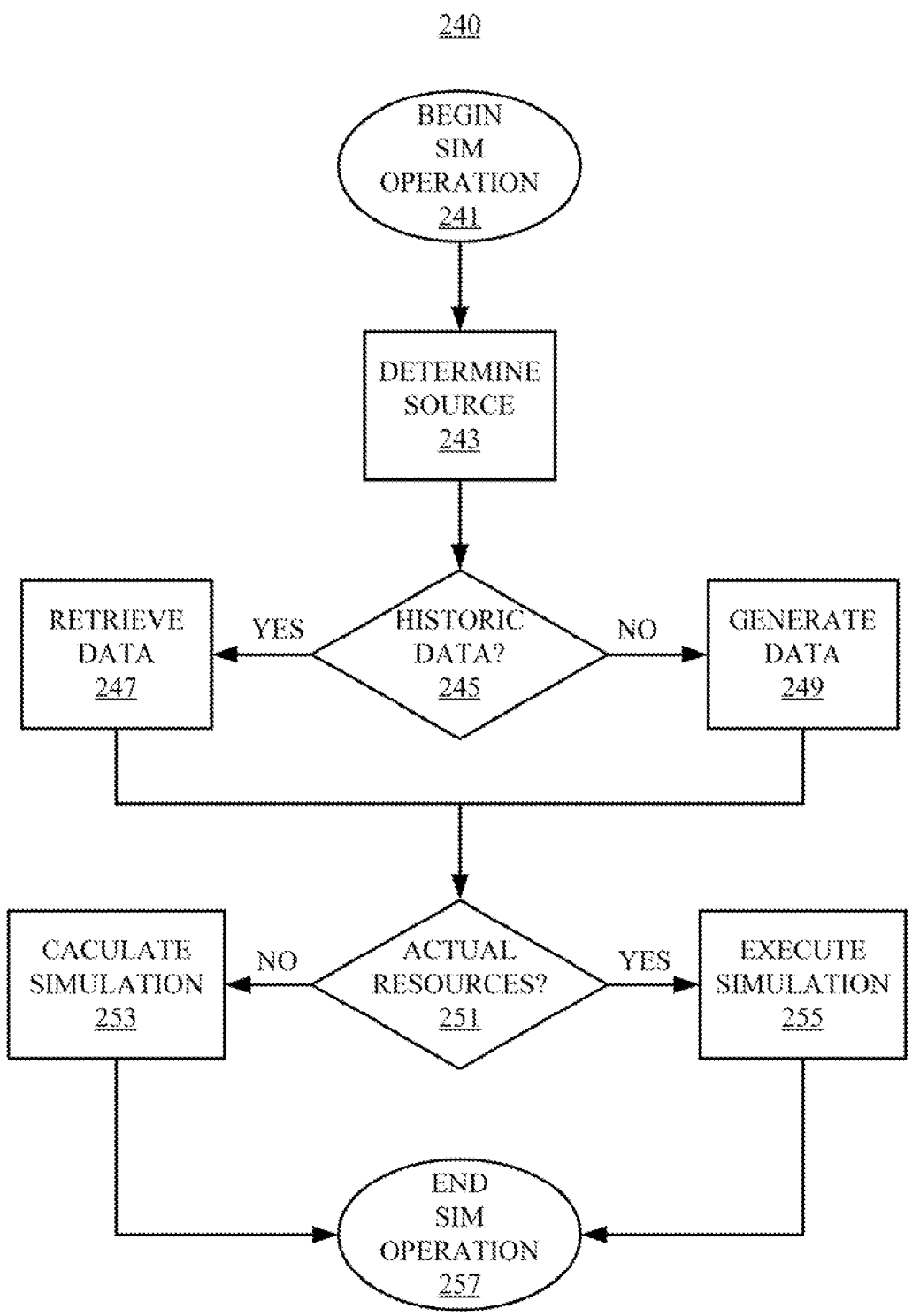
FIG. 7 is a flow chart of an exemplary simulation operation process, which illustrates a portion of the simulation process of FIG. 6 in more detail.

FIG. 7 is a flowchart of exemplary simulation operation process 240, corresponding to simulation operation step 229 of FIG. 6. Process 240 starts in a "Begin Simulation Operation" step 241 and control proceeds immediately to a "Determine Source" step 243. In step 243, process 240 scans historical simulation data in order to determine whether or not, with respect to the hypothetical scenario, there is sufficient data, either from the current client or other similar clients, to estimate load and the load's impact on affected resources of ODS framework 129. The load and the load's impact are two different aspects of historical data and the sufficiency of both must be addressed in the next step.

If there is sufficient historical data, then control proceeds to a "Retrieve Data" step 247 in which the historical data is retrieved from data store 161. If not, then control proceeds to a "Generate Data" step 249 in which process 249 creates relevant test data for the next step of the process. Relevant test data may be actually simulated data such as dummy client files and transactions or simply blocks of random data of an appropriate size. Of course, if there is some historical data but not enough to provide a meaningful simulation, control would proceed from step 245 to step 249 and only the data that is needed would be generated.

Once data has been acquired, either retrieved data in step 247, generated data in step 249 or some combination of the two, then control proceeds to an "Actual Resources?" step 251 in which process 240 determines whether or not to calculate the simulated data's load on ODS framework 129 or actually generate the load on the resources of framework 129. This decision can be based on either an administrator's or user's preference. For example, an administrator may determine that simulations are permitted to utilize actual resources only during off-hours and that during other times only calculated simulations can be run.

If, in step 251, process 240 determines that actual resources are to be utilized in the simulation, then control proceeds to an "Execute Simulation" step 255 in which the retrieved and/or generated data is actually used to transmit packets, generate processing cycles, occupy a portion of data store 161, and so on. During step 255 relevant information is collected to determine the load's impact on the resources of ODS framework 129. If, in step 251, process 240 determines that actual resources are not to be used, then control proceeds to a "Calculate Simulation" step in which the relevant information on the load's impact of ODS framework 129 is extrapolated based upon the retrieved and/or generated data. Finally, from both steps 253 and 255, control proceeds to an "End Simulation Operation" step 257 in which process 240 is Complete.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified steps performed in the same or a different order.

We claim:

1. A method for managing a service level agreement, the method comprising:
    receiving specification of a resource profile, corresponding to a dynamically allocated subset of computing resources, based on a first specified service level agreement;
    comparing, by one or more processors, a predetermined, projected demand profile to an actual demand profile;
    simulating, by the one or more processors, based upon the comparing, processing of the projected demand profile using the resource profile to determine a service level result; and
    determining that the service level result does not represent processing the predetermined, projected demand profile at an expected service level corresponding to the first specified service level agreement; and, in response to the determining,
    increasing one or more resource allocations in the dynamically allocated subset of computing resources to produce a modified resource profile;
    repeating the simulating and the determining using the modified resource profile; and
    generating, by the one or more processors, a second service level agreement, wherein the second service level agreement is based upon the modified resource profile and processes the workload profile at the expected service level.

2. The method of claim 1, wherein the projected demand profile includes scheduling information and the simulating incorporates the scheduling information in the processing.

3. The method of claim 1, wherein the subset of computing resources is one or more of a resource list, the resource list comprising:

allocated processing resources;
memory resources; and
communication bandwidth.

4. The method of claim 1, wherein the specified service level includes a base resource allocation, a maximum resource allocation, resource costs and rules for dynamically reallocating the resources based upon workload demand.

5. The method of claim 1, further comprising determining a cost associated with meeting the service level demand.

6. An apparatus for managing a service level agreement, the apparatus comprising:
  one or more processors;
  a memory, coupled to the one or more processors; and
  logic, stored on the memory and executed on the one or more processors, for:
    receiving specification of a resource profile, corresponding to a dynamically allocated subset of computing resources, based on a first specified service level agreement;
    comparing, by one or more processors, a predetermined, projected demand profile to an actual demand profile;
    simulating, by the one or more processors, based upon the comparing, processing of the projected demand profile using the resource profile to determine a service level result; and
    determining that the service level result does not represent processing the predetermined, projected demand profile at an expected service level corresponding to the first specified service level agreement; and, in response to the determining,
    increasing one or more resource allocations in the dynamically allocated subset of computing resources to produce a modified resource profile;
    repeating the simulating and the determining using the modified resource profile; and
    generating, by the one or more processors, a second service level agreement wherein the second service level agreement is based upon the modified resource profile and processes the workload profile at the expected service level.

7. The apparatus of claim 6, wherein the projected demand profile includes scheduling information and the simulating incorporates the scheduling information in the processing.

8. The apparatus of claim 6, wherein the subset of computing resources is one or more of a resource list, the resource list comprising:
  allocated processing resources;
  memory resources; and
  communication bandwidth.

9. The apparatus of claim 6, wherein the specified service level includes a base resource allocation, a maximum resource allocation, resource costs and rules for dynamically reallocating the resources based upon workload demand.

10. The apparatus of claim 6, the logic further comprising logic for determining a cost associated with meeting the service level demand.

11. A computer programming product for managing a service level agreement, comprising a non-transitory computer-readable storage medium having program code embodied therewith, the program code executable by a plurality of processors to perform a method comprising:
  receiving specification of a resource profile, corresponding to a dynamically allocated subset of computing resources, based on a first specified service level agreement;
  comparing, by one or more processors, a predetermined, projected demand profile to an actual demand profile;
  simulating, by the one or more processors, based upon the comparing, processing of the projected demand profile using the resource profile to determine a service level result; and
  determining that the service level result does not represent processing the predetermined, projected demand profile at an expected service level corresponding to the first specified service level agreement; and, in response to the determining,
  increasing one or more resource allocations in the dynamically allocated subset of computing resources to produce a modified resource profile;
  repeating the simulating and the determining using the modified resource profile; and
  generating, by the one or more processors, a second service level agreement wherein the second service level agreement is based upon the modified resource profile and processes the workload profile at the expected service level.

12. The computer programming product of claim 11, wherein the projected demand profile includes scheduling information and the simulating incorporates the scheduling information in the processing.

13. The computer programming product of claim 12, wherein the subset of computing resources is one or more of a resource list, the resource list comprising:
  allocated processing resources;
  memory resources; and
  communication bandwidth.

14. The computer programming product of claim 11, wherein the specified service level includes a base resource allocation, a maximum resource allocation, resource costs and rules for dynamically reallocating the resources based upon workload demand.

15. The computer programming product of claim 11, the logic further comprising logic for determining a cost associated with meeting the service level demand.

* * * * *